US012700518B2

(12) United States Patent
Miller et al.

(10) Patent No.: US 12,700,518 B2
(45) Date of Patent: Aug. 4, 2026

(54) BARIUM-BASED STANDARDS AND ASSOCIATED DEVICES, SYSTEMS, AND METHODS

(71) Applicant: International Isotopes Inc., Idaho Falls, ID (US)

(72) Inventors: John J. Miller, Idaho Falls, ID (US); Daniel J. Kalas, East Hampton, CT (US)

(73) Assignee: International Isotopes Inc., Idaho Falls, ID (US)

( * ) Notice: Subject to any disclaimer, the term of this patent is extended or adjusted under 35 U.S.C. 154(b) by 838 days.

(21) Appl. No.: 17/961,956

(22) Filed: Oct. 7, 2022

(65) Prior Publication Data

US 2023/0110756 A1    Apr. 13, 2023

Related U.S. Application Data

(60) Provisional application No. 63/278,018, filed on Nov. 10, 2021, provisional application No. 63/253,745, filed on Oct. 8, 2021.

(51) Int. Cl.
| | |
|---|---|
| *G21G 4/06* | (2006.01) |
| *G01T 7/00* | (2006.01) |
| *G21F 5/015* | (2006.01) |

(52) U.S. Cl.
CPC .............. *G21G 4/06* (2013.01); *G01T 7/005* (2013.01); *G21F 5/015* (2013.01)

(58) Field of Classification Search
None
See application file for complete search history.

(56) References Cited

U.S. PATENT DOCUMENTS

| | | | |
|---|---|---|---|
| 1,973,069 | A | 9/1934 | Henne |
| 2,831,122 | A * | 4/1958 | Brucer .................... G21G 4/06 |
| | | | 250/503.1 |
| 3,287,426 | A | 11/1966 | Christe et al. |
| D232,355 | S | 8/1974 | Wiedmann |
| 4,070,439 | A | 1/1978 | Osaka et al. |
| 4,310,488 | A | 1/1982 | Rahm |
| 4,349,529 | A | 9/1982 | Morcos et al. |

(Continued)

FOREIGN PATENT DOCUMENTS

WO    WO-2020104800    5/2020

OTHER PUBLICATIONS

Hamideh, Amin, "Determination of Conversion Factors for Various Calibration Geometries using Barium-133 in a Silver Zeolite Cartridge," Louisiana State University and Argricultural and Mechanical College, published 2019, 49 pages.

(Continued)

*Primary Examiner* — Joseph D Anthony
(74) *Attorney, Agent, or Firm* — Perkins Coie LLP

(57)    ABSTRACT

The present technology is directed to barium-133 ("Ba-133") based standards that simulate expected energy emissions of iodine-131 ("I-131"), and thus can be used to calibrate radioactivity measuring instruments (e.g., dose calibrators) used to measure the radioactivity of I-131 drug products. The Ba-133 standards can be manufactured in geometries typical of those used to administer I-131 drug products, including, for example, as a capsule, a syringe, a vial, etc.

15 Claims, 10 Drawing Sheets

I-131 Gamma Emissions

| Energy (keV) | Yield | keV/Dis |
|---|---|---|
| 80.185 | 2.6070% | 2.090423 |
| 85.9 | 0.0051% | 0.004381 |
| 163.93 | 0.0211% | 0.034589 |
| 177.214 | 0.2770% | 0.490883 |
| 232.18 | 0.0023% | 0.00534 |
| 272.498 | 0.0581% | 0.158321 |
| 284.305 | 6.1400% | 17.45633 |
| 295.8 | 0.0012% | 0.00355 |
| 302.4 | 0.0046% | 0.01391 |
| 318.088 | 0.0807% | 0.256697 |
| 324.651 | 0.0244% | 0.079215 |
| 325.789 | 0.2740% | 0.892662 |
| 358.4 | 0.0170% | 0.060928 |
| 364.489 | 81.2000% | 295.9651 |
| 404.814 | 0.0552% | 0.223457 |
| 503.004 | 0.3540% | 1.780634 |
| 636.989 | 7.1200% | 45.35362 |
| 642.719 | 0.2183% | 1.403056 |
| 722.911 | 1.786% | 12.91119 |

379.1842

Ba-133 Gamma Emissions

| Energy (keV) | Yield | keV/Dis |
|---|---|---|
| 43.1622 | 2.140% | 1.137671 |
| 79.6142 | 2.630% | 2.093853 |
| 80.9979 | 33.310% | 26.9804 |
| 160.6121 | 0.638% | 1.024705 |
| 223.2368 | 0.450% | 1.004566 |
| 276.3989 | 7.130% | 19.70724 |
| 302.8508 | 18.310% | 55.45198 |
| 356.0129 | 62.050% | 220.906 |
| 383.8485 | 8.940% | 34.31606 |

362.6225

$\gamma_{Ba\text{-}133}/\gamma_{I\text{-}131}$:  95.6%

(56)                    References Cited

U.S. PATENT DOCUMENTS

| | | | | |
|---|---|---|---|---|
| 4,430,258 A | * | 2/1984 | McFarland | G21G 4/04 |
| | | | | 252/644 |
| 4,566,114 A | * | 1/1986 | Watt | G01N 23/12 |
| | | | | 250/359.1 |
| 4,674,640 A | | 6/1987 | Asa | |
| 4,876,406 A | | 10/1989 | Foulletier et al. | |
| 5,091,602 A | | 2/1992 | Park et al. | |
| 5,254,314 A | | 10/1993 | Yu | |
| 5,295,599 A | | 3/1994 | Smith | |
| 5,399,549 A | | 3/1995 | Felix et al. | |
| 5,399,796 A | | 3/1995 | Correia et al. | |
| 5,446,216 A | | 8/1995 | Rao | |
| 5,513,768 A | | 5/1996 | Smith | |
| 5,545,770 A | | 8/1996 | Rao | |
| D395,239 S | | 6/1998 | Davis | |
| 5,831,136 A | | 11/1998 | Rao | |
| 5,841,006 A | | 11/1998 | Cuzzato et al. | |
| 5,918,106 A | | 6/1999 | Bulko et al. | |
| 6,074,985 A | | 6/2000 | Elsheikh et al. | |
| 6,127,586 A | | 10/2000 | Scott et al. | |
| 6,201,247 B1 | | 3/2001 | Lutheran et al. | |
| 6,229,058 B1 | | 5/2001 | Sievert et al. | |
| 6,232,514 B1 | | 5/2001 | Cuzzato et al. | |
| 6,268,541 B1 | | 7/2001 | Kono et al. | |
| 6,392,106 B1 | | 5/2002 | Kono et al. | |
| 6,433,233 B1 | | 8/2002 | Kanemura et al. | |
| 6,479,718 B1 | | 11/2002 | Elsheikh et al. | |
| 6,503,865 B1 | | 1/2003 | Kanemura et al. | |
| 6,635,893 B2 | | 10/2003 | O'Kane, Sr. et al. | |
| 6,831,269 B2 | | 12/2004 | Zyromski et al. | |
| 6,841,705 B2 | | 1/2005 | Yuichi et al. | |
| 6,927,406 B2 | | 8/2005 | Zyromski et al. | |
| 7,067,707 B2 | | 6/2006 | Piepho et al. | |
| 7,071,368 B1 | | 7/2006 | Merkel et al. | |
| 7,074,973 B2 | | 7/2006 | Nappa et al. | |
| 7,233,012 B2 | | 6/2007 | Zyromski et al. | |
| 7,537,560 B2 | | 5/2009 | Powers et al. | |
| 7,615,740 B2 | | 11/2009 | Allberg | |
| 7,630,907 B2 | | 12/2009 | Whittacre et al. | |
| 7,655,935 B1 | | 2/2010 | Frank | |
| 7,668,662 B2 | | 2/2010 | Kroll et al. | |
| 7,683,332 B2 | | 3/2010 | Chang | |
| 7,711,661 B2 | | 5/2010 | Gentile et al. | |
| 7,745,673 B2 | | 6/2010 | Omotowa | |
| 7,825,372 B2 | | 11/2010 | Allberg | |
| 7,877,340 B2 | | 1/2011 | Gentile et al. | |
| 8,145,502 B2 | | 3/2012 | Whittacre et al. | |
| 8,586,932 B2 | | 11/2013 | Rousso et al. | |
| D723,181 S | | 2/2015 | Kawamura | |
| D732,684 S | | 6/2015 | Ooi | |
| 9,117,561 B2 | | 8/2015 | Allberg | |
| 9,268,043 B2 | | 2/2016 | DeVolpi | |
| D762,873 S | | 8/2016 | Baum | |
| 9,847,214 B2 | | 12/2017 | Badiei et al. | |
| D833,639 S | | 11/2018 | Peltosaari | |
| 10,371,836 B2 | | 8/2019 | Wang et al. | |
| 10,379,234 B2 | | 8/2019 | Wei et al. | |
| 10,403,411 B2 | | 9/2019 | Schreuder et al. | |
| D882,113 S | | 4/2020 | Motadel | |
| 10,722,171 B2 | | 7/2020 | Valdastri et al. | |
| 10,872,751 B2 | | 12/2020 | Badiei et al. | |
| 10,928,545 B2 | | 2/2021 | Schaap | |
| D954,296 S | | 6/2022 | Hendrikx | |
| D989,343 S | | 6/2023 | Gao | |
| 2001/0049457 A1 | | 12/2001 | Stephens | |
| 2004/0075048 A1 | * | 4/2004 | Zyromski | A61B 6/583 |
| | | | | 250/493.1 |
| 2004/0076258 A1 | * | 4/2004 | Zyromski | G01T 1/169 |
| | | | | 378/16 |
| 2008/0262274 A1 | | 10/2008 | Omotowa | |
| 2008/0262275 A1 | | 10/2008 | Omotowa | |
| 2008/0262276 A1 | | 10/2008 | Omotowa | |
| 2008/0262277 A1 | | 10/2008 | Omotowa | |
| 2009/0127449 A1 | | 5/2009 | Iwatschenko | |
| 2009/0283668 A1 | * | 11/2009 | Gilbertson | G01D 18/00 |
| | | | | 250/252.1 |
| 2012/0058027 A1 | | 3/2012 | Song | |
| 2014/0256058 A1 | | 9/2014 | Dobrowolski | |
| 2014/0271360 A1 | | 9/2014 | Buse | |
| 2016/0290846 A1 | * | 10/2016 | Chazal | G01N 23/083 |
| 2017/0042500 A1 | * | 2/2017 | Bhattacharya | G01T 7/005 |
| 2020/0217701 A1 | * | 7/2020 | Chazal | E21B 47/10 |

OTHER PUBLICATIONS

International Search Report and Written Opinion for International Patent Application No. PCT/US22/46093, Applicant: International Isotopes, Inc., mailed Feb. 7, 2023, 9 pages.

Christe et al. Silicon Tetrafluoride, a New Fluorinating Agent, 1964, J. Org. Chem., p. 3007-3009.

Okazaki et al., "Fluorination with sodium fluoride. IV. Fluorination," Ibaraki University, Hitachi, Japan, Kogyo Kagaku Zasshi 1969, 72(3), 1 page.

Park et al., "A study on the fluorination of pentachloroethane," CFC Alternatives Technology Center, Korea Institute Science and Technology, Kongop Hwahak (1993), 4(2), 1 page.

Schumb, W.C., "Some Metathetical Reactions of the Gaseous Fluorides of Group IV," Journal of the American Chemical Society, vol. 74, Jun. 1951, pp. 1754-1760.

* cited by examiner

I-131 Gamma Emissions

| Energy (keV) | Yield | keV/Dis |
|---|---|---|
| 80.185 | 2.6070% | 2.090423 |
| 85.9 | 0.0051% | 0.004381 |
| 163.93 | 0.0211% | 0.034589 |
| 177.214 | 0.2770% | 0.490883 |
| 232.18 | 0.0023% | 0.00534 |
| 272.498 | 0.0581% | 0.158321 |
| 284.305 | 6.1400% | 17.45633 |
| 295.8 | 0.0012% | 0.00355 |
| 302.4 | 0.0046% | 0.01391 |
| 318.088 | 0.0807% | 0.256697 |
| 324.651 | 0.0244% | 0.079215 |
| 325.789 | 0.2740% | 0.892662 |
| 358.4 | 0.0170% | 0.060928 |
| 364.489 | 81.2000% | 295.9651 |
| 404.814 | 0.0552% | 0.223457 |
| 503.004 | 0.3540% | 1.780634 |
| 636.989 | 7.1200% | 45.35362 |
| 642.719 | 0.2183% | 1.403056 |
| 722.911 | 1.786% | 12.91119 |
| | | 379.1842 |

Ba-133 Gamma Emissions

| Energy (keV) | Yield | keV/Dis |
|---|---|---|
| 43.1622 | 2.140% | 1.137671 |
| 79.6142 | 2.630% | 2.093853 |
| 80.9979 | 33.310% | 26.9804 |
| 160.6121 | 0.638% | 1.024705 |
| 223.2368 | 0.450% | 1.004566 |
| 276.3989 | 7.130% | 19.70724 |
| 302.8508 | 18.310% | 55.45198 |
| 356.0129 | 62.050% | 220.906 |
| 383.8485 | 8.940% | 34.31606 |
| | | 362.6225 |

$\gamma_{Ba\text{-}133}/\gamma_{I\text{-}131}$:   95.6%

FIG. 1

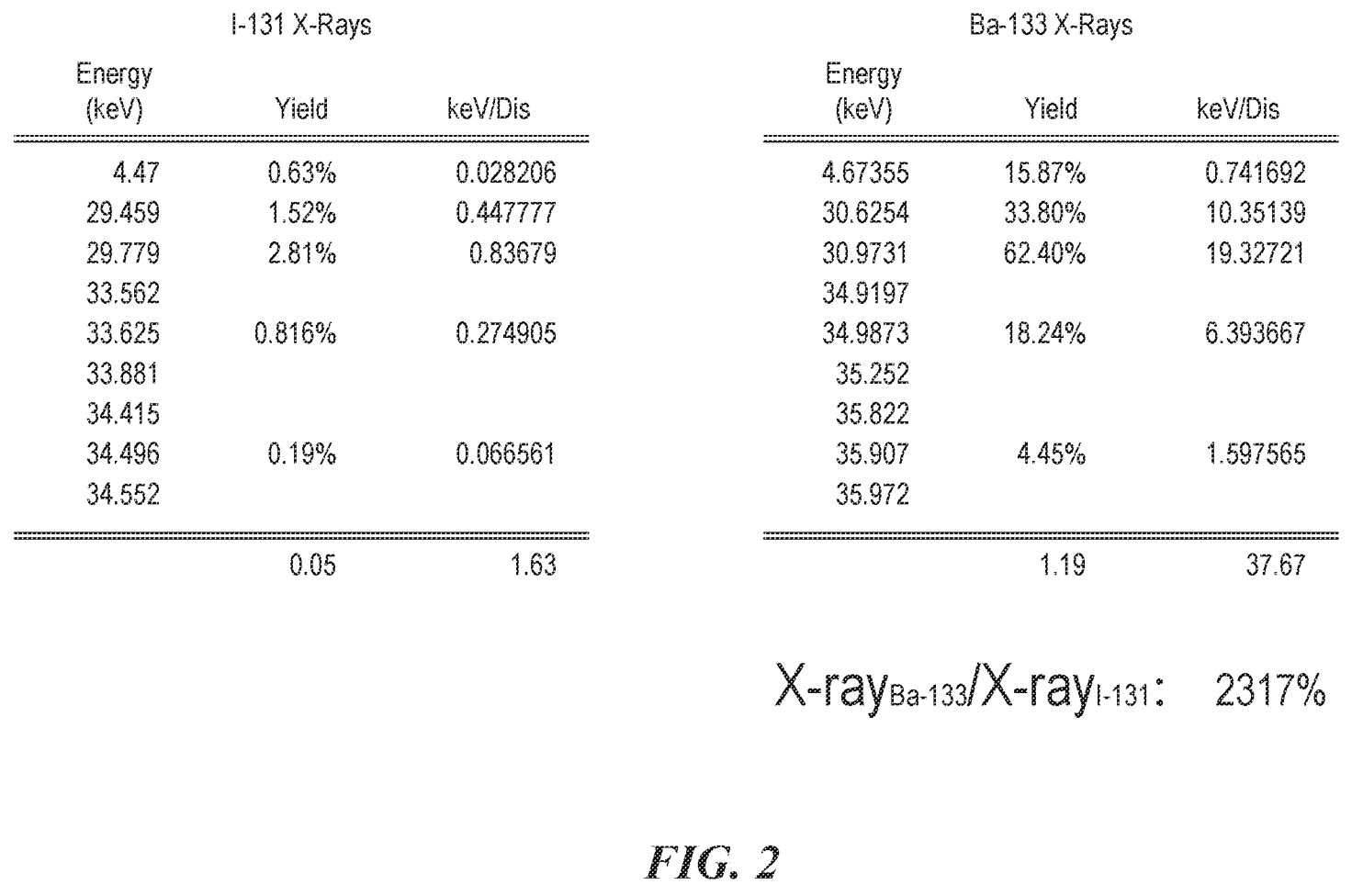

I-131 X-Rays

| Energy (keV) | Yield | keV/Dis |
|---|---|---|
| 4.47 | 0.63% | 0.028206 |
| 29.459 | 1.52% | 0.447777 |
| 29.779 | 2.81% | 0.83679 |
| 33.562 | | |
| 33.625 | 0.816% | 0.274905 |
| 33.881 | | |
| 34.415 | | |
| 34.496 | 0.19% | 0.066561 |
| 34.552 | | |
| | 0.05 | 1.63 |

Ba-133 X-Rays

| Energy (keV) | Yield | keV/Dis |
|---|---|---|
| 4.67355 | 15.87% | 0.741692 |
| 30.6254 | 33.80% | 10.35139 |
| 30.9731 | 62.40% | 19.32721 |
| 34.9197 | | |
| 34.9873 | 18.24% | 6.393667 |
| 35.252 | | |
| 35.822 | | |
| 35.907 | 4.45% | 1.597565 |
| 35.972 | | |
| | 1.19 | 37.67 |

$X\text{-}ray_{Ba\text{-}133}/X\text{-}ray_{I\text{-}131}$:     2317%

*FIG. 2*

BARIUM-BASED STANDARDS AND ASSOCIATED DEVICES, SYSTEMS, AND METHODS

CROSS-REFERENCE TO RELATED APPLICATIONS

The present application claims priority to U.S. Provisional Patent Application No. 63/253,745, filed Oct. 8, 2021, and U.S. Provisional Patent Application No. 63/278,018, filed Nov. 10, 2021, each of which is incorporated by reference herein in its entirety.

TECHNICAL FIELD

The present disclosure is generally related to standards for calibrating radioactivity measuring instruments, and in particular, to, e.g., standards for calibrating, e.g., dose calibrators in the Iodine setting.

BACKGROUND

Iodine-131 ("I-131") is a radionuclide used in nuclear medicine to treat hyperthyroidism, cancers of the thyroid gland, and other medical conditions. I-131 may also be used in low doses for diagnostic purposes. I-131 drug products can be administered orally (e.g., via capsule or solution) or intravenously (e.g., via syringe). To ensure the effectiveness and safety of I-131 drug products, the dosage (e.g., radioactivity) of the I-131 drug product is typically determined using a properly calibrated radioactivity measuring instrument, such as a 4 pi well-type ionization chamber, prior to administering the I-131 drug product to a patient. Calibration of such instruments is typically performed with a "source standard" that contains the same radionuclide having a known radioactivity and configured in the same or similar geometry as the drug product. However, I-131 has a short half-life of about 8 days. Due to this rapid decay, use of I-131 as a source standard can be challenging and impractical.

BRIEF DESCRIPTION OF THE DRAWINGS

FIG. 1 are tables showing the main photon energy and total photon energies per decay for I-131 and Ba-133 gamma emissions.

FIG. 2 are tables showing the main photon energy and total photon energies per decay for I-131 and Ba-133 X ray emissions.

DETAILED DESCRIPTION

Figure 3:
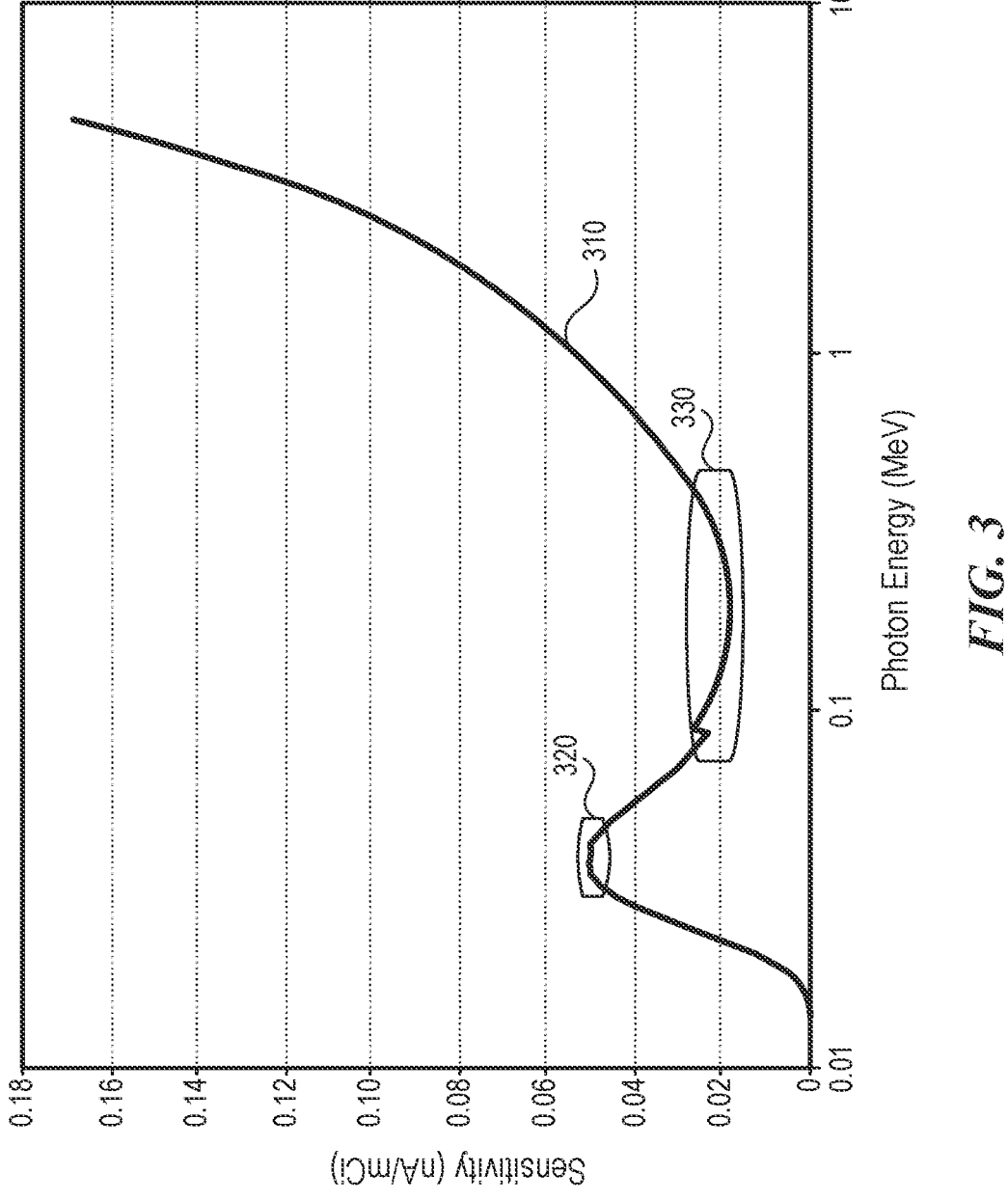
FIG. 3 is a line graph illustrating sensitivity curves for I-131 and Ba-133 obtained using a radioactivity measuring instrument.

The present technology is generally directed to use of radioisotopes having a relatively long half-life as surrogate source standards for radioisotopes having relatively short half-lives. For example, embodiments of the present technology described herein use barium-133 ("Ba-133") as a surrogate source standard for calibrating radioactivity measuring instruments for I-131 drug products. Ba-133 has generally similar photon energies and emission rates as I-131, but has a much longer half-life of about 10.5 years, mitigating the effects of decay on the standard. However, despite the general similarities between energy emissions of I-131 and Ba-133, there are significant differences that can inhibit or prevent I-131 radioactivity measuring instruments from being properly calibrated using Ba-133-based standards.

Embodiments of the present technology are directed to Ba-133-based standards that mimic, or at least approximately mimic, expected energy emissions of I-131, and thus can be used to calibrate radioactivity measuring instruments (e.g., dose calibrators) used to measure the radioactivity of I-131 drug products. Embodiments of the Ba-133 standards generally include a container housing a Ba-133 source matrix, and can be manufactured in geometries typical of the objects used to administer I-131 products, including, for example, a capsule, a syringe, and a vial. Moreover, as described in detail below, the containers housing the Ba-133 source matrix are configured to selectively attenuate low energy X-ray energy emissions such that the Ba-133 standards exhibit similar energy emissions as I-131. For example, in some embodiments the Ba-133 standards described herein are configured to have a measurable radioactivity on an I-131 dial setting of a (previously calibrated) dose calibrator that is within at least $\pm_{10}$%, $\pm 5$%, or $\pm 1$% of the radioactivity of the Ba-133 source matrix as measured on a Ba-133 dial setting of the dose calibrator. Without being bound by theory, the present technology is therefore expected to improve the accuracy of Ba-133 based standards for calibrating I-131 radioactivity measuring instruments.

Certain details are set forth in the following description and in FIGS. 1-9 to provide a thorough understanding of various embodiments of the present technology. In other instances, well-known structures, materials, operations, and/or systems often associated with radioactive measuring systems and methods are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles, and other features shown in the Figures are merely illustrative of particular embodiments of the present technology. Accordingly, other embodiments can have other details, dimensions, angles, and features without departing from the spirit or scope of the present disclosure. In addition, those of ordinary skill in the art will appreciate that further embodiments of the present technology can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 410 is first introduced and discussed with reference to FIG. 4.

As used herein, the use of relative terminology, such as "about", "approximately", "substantially" and the like refer to the stated value plus or minus ten percent. For example, the use of the term "about 100" refers to a range of from 90 to 110, inclusive. In instances in which the context requires otherwise and/or relative terminology is used in reference to something that does not include a numerical value, the terms are given their ordinary meaning to one skilled in the art.

As used herein, the terms "calibration source standard," "source standard," "standard," or variations thereof refer to a composition, device, container, tool, or the like that is used as a measure, norm, or model in a comparative evaluation, such as to establish a standard radioactivity level against which other radioactivity levels can be compared. For example, a "source standard" can be used to calibrate a radioactivity measuring instrument such as a dose calibrator, which can subsequently be used to measure the radioactivity of a radioactivity-containing drug product.

As used herein, the term "source matrix" refers to a substance, fixture, solution, or the like that carries or otherwise contains radioactive material. For example, a source matrix can be an epoxy resin, resin bead, ceramic, electroplated metallic surface, elemental metal, etc. that contains or otherwise sequesters radioactive material, such Ba-133.

The headings provided herein are for convenience only and do not limit the scope or meaning of the present technology.

A. Energy Emissions of Iodine-131 and Barium-133

I-131 and Ba-133 have generally similar main photon energies and total photon energies per decay event (e.g., per decay of a single atom). For example, FIG. 1 includes tables showing the main photon energies and total photon energies per decay of gamma emissions for I-131 and Ba-133. As FIG. 1 illustrates, the main photon energy of I-131 is about 364 kiloelectron volts ("keV") (81.2%) and the main photon energy of Ba-133 is about 356 keV (62.1%). The total photon energy in gamma emissions per decay of I-131 is about 379 kiloelectron volts per disintegration ("keV/Dis"), and the total photon energy in gamma emissions per decay of Ba-133 is about 363 keV/Dis. Thus, for gamma emissions, the total photon energy in keV per decay for I-131 and Ba-133 are within about 5% of each other.

However, I-131 and Ba-133 have a significant difference in the emission rate of low energy X-rays having a photon energy of between about 30-60 keV. For example, FIG. 2 are tables comparing the main photon energies and total photon energies per decay of X ray emissions for I-131 and Ba-133. As FIG. 2 illustrates, the total photon energy in X rays per decay of I-131 is about 1.6 keV, while the total photon energy in X rays per decay of Ba-133 is about 37.7 keV. Thus, for X ray emissions, the energy in keV per decay of Ba-133 is over 2,000% greater than the energy in keV per decay of I-131.

The radiosensitivity of ionization chambers (e.g., dose calibrators) is a function of the energy of the photon interacting with the chamber gas. For example, line 310 in FIG. 3 illustrates the sensitivity curve for an ATOMLAB dose calibrator (from Biodex Medical Systems of Shirley, New York). The x-axis illustrates the photon energy in MeV and the y-axis illustrates the sensitivity of the detected radioactivity emissions in nanoamperes per millicurie ("nA/mCi"). Oval 320 illustrates the sensitivity of the detector in the approximate photon energy range of 30-50 keV (e.g., X ray emissions), and oval 330 illustrates the sensitivity of the detector in the approximate photon energy range of 80-700 keV (e.g., gamma emissions). As observed from the chart the detector is approximately 2.5 times more sensitive to photons in the energy range encompassed by the oval 320 as it is to photons in the energy range encompassed by the oval 330. As noted earlier, the gamma energy per disintegration that falls within the boundaries of the oval 330 for Ba-133 and I-131 are within approximately 5%, whereas the Ba-133 X ray emissions that fall within the boundary of the oval 320 are approximately 2000% greater than that for I-131. This difference has heretofore rendered Ba-133 an inaccurate surrogate source standard for calibrating I-131 radioactivity measuring instruments.

Embodiments of the present technology are expected to address the foregoing deficiencies of Ba-133 as a calibration standard for I-131 by providing Ba-133-based standards that mimic or emulate the radioactivity of I-131. For example, as described in detail below, the present technology includes Ba-133 standards having energy attenuation features that are designed to selectively attenuate X-ray emissions of certain photon energies (e.g., emissions between about 30-60 keV, or between about 30-50 keV) such that the Ba-133 standards have energy emission profiles similar to I-131. As a result, the present technology provides Ba-133-based standards that can be used to accurately calibrate I-131 radioactivity measuring instruments.

B. Embodiments of Barium-133-Based Standards for Iodine-131

As set forth above, the present technology includes Ba-133-based standards that are designed to selectively attenuate low energy X-ray energy emissions such that the Ba-133 standards exhibit similar energy emissions as I-131. As described in detail below with reference to FIGS. 4A-6B, in some embodiments the Ba-133-based standards include a container for housing the Ba-133 radioactive material that is specifically designed to attenuate the X-ray energy emissions of the Ba-133 radioactive material.

Figures 4A, 4B:
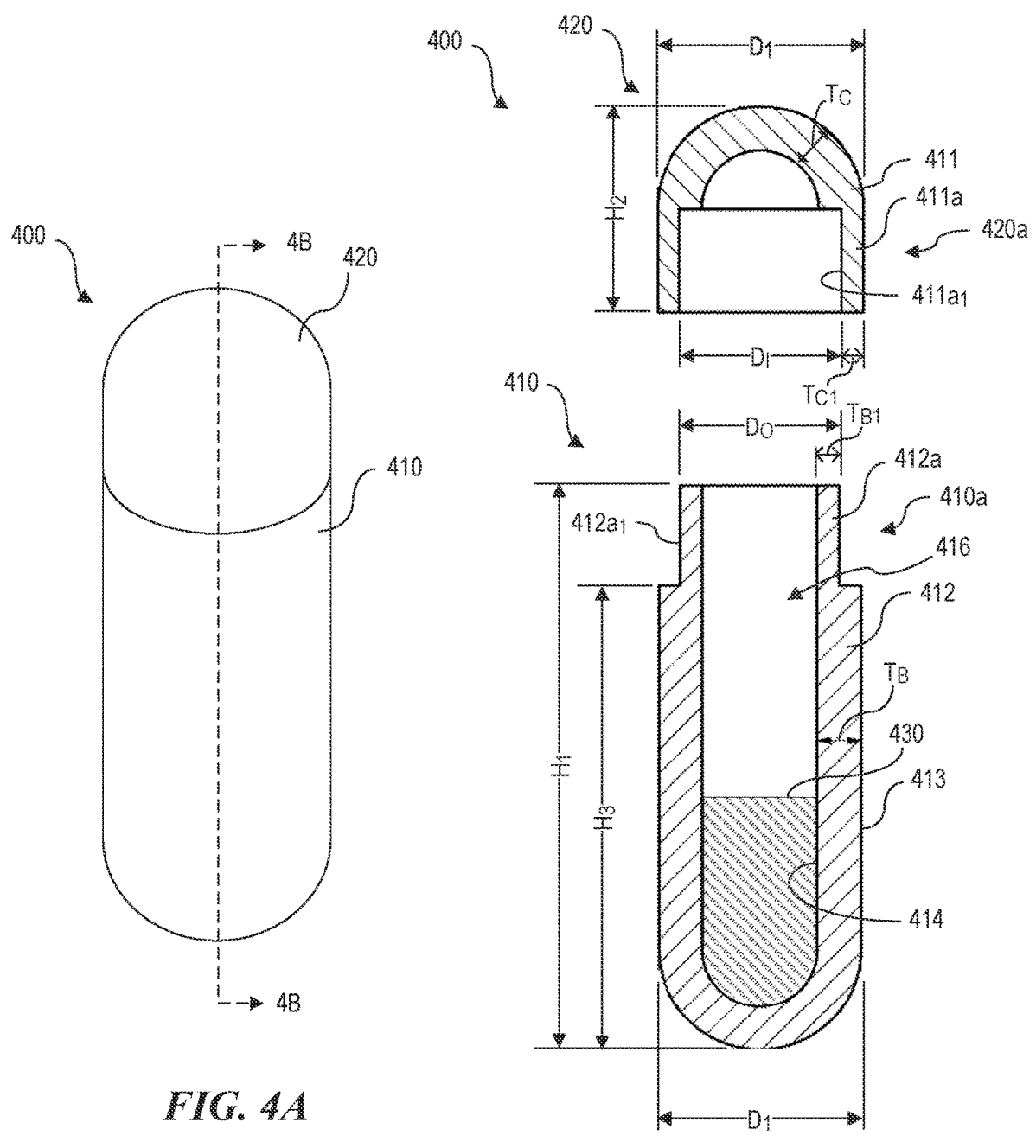
FIG. 4A is an isometric view of a container for holding a Ba-133 source matrix and configured for use as a Ba-133-based standard in accordance with embodiments of the present technology.
FIG. 4B is an exploded cross-sectional side view of the container shown in FIG. 4A.

FIGS. 4A and 4B illustrate a container 400 (which may also be referred to herein as a "capsule 400" and the like) configured for use as a Ba-133-based standard in accordance with embodiments of the present technology. In particular, FIG. 4A is an isometric view of the container 400, and FIG. 4B is an exploded cross-sectional side view of the container 400 taken along line 4B-4B in FIG. 4A. As described in detail below, the container 400 can hold a Ba-133 source matrix 430, and is designed to attenuate certain energy emissions from the Ba-133 source matrix 430 such that the detectable energy emissions from the container 400 are similar to standard energy emissions of I-131. As a result, the container 400 enables Ba-133 to be used as a sufficiently accurate source-standard for calibrating I-131 radioactivity measuring instruments. The calibrated I-131 radioactivity measuring instruments can then be used to measure and confirm the radioactivity of I-131 containing drug products that will be used for therapeutic purposes.

Referring first to FIG. 4A, in some embodiments the container 400 is a capsule or pill-shaped structure that can have a configuration similar to or the same as a capsule- or pill-based I-131 drug product. For example, in the illustrated embodiment the container 400 has a generally cylindrical shape with a body 410 and a cap 420. In other embodiments, containers configured in accordance with the present technology can have other shapes, including, for example rectangular shapes, spherical shapes, irregular shapes, combinations thereof and the like. As described in greater detail below with respect to FIG. 4B, the cap 420 can be removed from the body 410 to facilitate placement of the radioactive source matrix (e.g., the Ba-133 source matrix 430) inside the container 400. Once the radioactive source matrix 430 is placed inside the container 400, the cap 420 can be secured to the body 410 to prevent leakage of the radioactive source matrix 430.

In some embodiments, the container 400 is composed of stainless steel (e.g., grade 304 stainless steel), although in other embodiments, other suitable materials can be used. Other suitable materials can include, for example, alloys of aluminum, tungsten, titanium, etc. Despite being in the shape of a capsule or pill, the container 400 is not limited to being formed from biocompatible materials or materials suitable for human consumption because the container 400 is not for therapeutic consumption. Instead, the container 400 is a source standard for calibrating radioactivity measuring instruments that measure radioactivity of therapeutic pills that are intended for therapeutic consumption. Indeed, in many embodiments the container 400 can be formed of a material not suitable for human consumption (e.g., stainless steel), as such materials are better able to attenuate energy emissions from the radioactive source matrix, as described below.

Referring next to FIG. 4B, the body 410 includes an interior chamber 416 configured to receive and house the radioactive source matrix 430. The chamber 416 is defined by a body wall 412 (e.g., a side wall, barrier, etc.) having a first thickness $T_B$ that extends between a first (e.g., outwardly-facing) surface 413 and a second (e.g., inwardly-facing) surface 414 of the body wall 412. The first thickness $T_B$ can be between about 0.025 inch and about 0.070 inch, such as between about 0.035 inch and about 0.060 inch, although other values outside the foregoing parameters are possible and are within the scope of the present technology. In some embodiments, the first thickness $T_B$ is based at least in part on the material composition of the body wall 412 (e.g., the thickness is selected based at least in part on a photon mass attenuation coefficient of the material, described in greater detail below). In some embodiments, the first thickness $T_B$ is substantially uniform throughout the entirety of the body 410, except for at an upper body portion 410a that is configured to engage with the cap 420. More specifically, in the illustrated embodiment, a cylindrical segment 412a of the body wall 412 in the upper body portion 410a has a second thickness $T_{B1}$ that is less than the first thickness $T_B$. For example, the second thickness $T_{B1}$ can be between about 0.0125 inch and about 0.035 inch, although values outside the foregoing parameters are possible and are within the scope of the present technology.

The cap 420 is defined by a cap wall 411 (e.g., a side wall, barrier, etc.) having generally similar properties to the body wall 412. For example, the cap wall 411 can have a first thickness $T_c$ that is equal to or at least approximately equal to the first thickness $T_B$ of the body wall 412, such as between about 0.025 inch and about 0.070 inch, and/or between about 0.035 inch and about 0.060 inch. The first thickness $T_c$ can be substantially uniform throughout the entirety of the cap 420, except for at a lower cap portion 420a that is configured to engage with the upper body portion 410a. In particular, a cylindrical segment 411a of the cap wall 411 in the lower cap portion 420a has a second thickness $T_{C1}$ that is less than the first thickness $T_C$. For example, the second thickness $T_{C1}$ can be between about 0.0125 inch and about 0.035 inch, although values outside the foregoing parameters are also possible and within the scope of the present technology.

The lower cap portion 420a is configured to releasably engage the upper body portion 410a to secure the cap 420 to the body 410. In the illustrated embodiment, for example, an inner surface 411a1 of the cylindrical segment 411a defines an inner diameter $D_I$ that is equal to or very slightly greater than an outer diameter $D_O$ of an outer surface 412ai of the cylindrical segment 412a. Accordingly, the lower cap portion 420a can be slid or press fit over the upper body portion 410a (and/or the upper body portion 410a can be inserted into the lower cap portion 420a) such that the inner surface 411ai of the cylindrical segment 411a is in apposition with the outer surface 412ai of the cylindrical segment 412a. In some embodiments, the combined thickness $T_{C1}$ of the cylindrical segment 411a and the thickness TBS of the cylindrical segment 412a together are equal to or at least approximately equal to the first thickness $T_B$ of the body wall 412 and/or the first thickness $T_c$ of the cap wall 411. In such embodiments, the thickness of the walls defining the chamber 416 are therefore substantially uniform once the cap 420 is secured to the body 410. In some embodiments, the cap 420 is secured to the body 410 via frictional engagement of the inner surface 411a1 of the cylindrical segment 411a and the outer surface 412ai of the cylindrical segment 412a to prevent or at least reduce any leakage of materials between the cap 420 and the body 410 (e.g., prevent leakage in excess of 5 nCi), although in some embodiments additional techniques may be used to further secure the cap 420 to the body 410.

The container 400 can have overall dimensions comparable to a standard capsule-based I-131 drug product. For example, in some embodiments the body 410 can have a height $H_1$ between about 0.5 inch and about 2 inches, or between about 0.5 inch and 1 inch (e.g., about 0.7 inch), and a Diameter $D_1$ between about 0.125 inch and about 1 inch, or between about 0.125 inch and 0.5 inch (e.g., about 0.25 inch). The cap 420 can have a height $H_2$ between about 0.125 inch and about 1 inch (e.g., about 0.25 inch), and a diameter $D_2$ that is equal to or substantially equal to the diameter $D_1$ of the body 410, such as between about 0.125 inch and about 1 inch. As described previously, the body 410 and the cap 420 overlap when the cap 420 is secured to the body 410, such that the total height of the container 400 is less than the sum of the height $H_1$ of the body 410 and the height $H_2$ of the cap 420. For example, the non-overlapping region of the body 410 can have a height $H_3$ between about 0.35 inch and about 1.7 inch (e.g., about 0.5 inch). Accordingly, the total height of the container 400 can be between about 0.5 inches and about 2.5 inches. One skilled in the art will recognize that the present disclosure encompasses containers having dimensions outside the foregoing ranges. Accordingly, the present technology is not limited to the foregoing dimensions, sizes, configurations, spacings, etc., and other embodiments may have other dimensions, sizes, configurations, and spacings without departing from the present disclosure.

The container 400 is configured to selectively attenuate X ray emissions from radioactive material positioned within the chamber 416. In particular, the body wall 412 can have properties that attenuate X ray emissions, such as those in the energy range of between about 30 keV and about 60 keV, between about 30 keV and about 50 keV, between about 30 keV and about 40 keV, and/or between about 30 keV and about 36 keV. For example, the body wall 412 can be configured to attenuate X ray emissions by at least 50%, at least 75%, at least 80%, at least 85%, at least 90%, or at least 95%. In some embodiments, this attenuation results from the thickness $T_B$ of the body wall 412, the material composition of the body wall 412, and/or a combination of the thickness $T_B$ and the material composition. For example, in embodiments in which the container 400 is composed of stainless steel, the body wall 412 can have a thickness $T_B$ between about 0.04 inch and about 0.07 inch, or between about 0.05 inch and 0.06 inch, or about 0.055 inch. For other materials (e.g., aluminum, tungsten, titanium, etc., and alloys thereof), the wall thickness can be determined based on the respective photon mass attenuation coefficients for the other materials, as described in Section C below.

In some embodiments, the container 400 does not (or at least does not substantially) attenuate energy emissions in other spectrums (e.g., gamma emissions). The container 400 therefore causes the externally detectable energy emissions of Ba-133 contained within the container 400 to be similar to the expected energy emissions of I-131. The container 400 can thus be used as a Ba-133-based standard for calibrating I-131 radioactivity measuring instruments and is expected to alleviate or at least reduce the conventional shortcomings of using Ba-133 as a source standard for calibrating I-131 radioactivity measuring instruments.

Figure 5C:
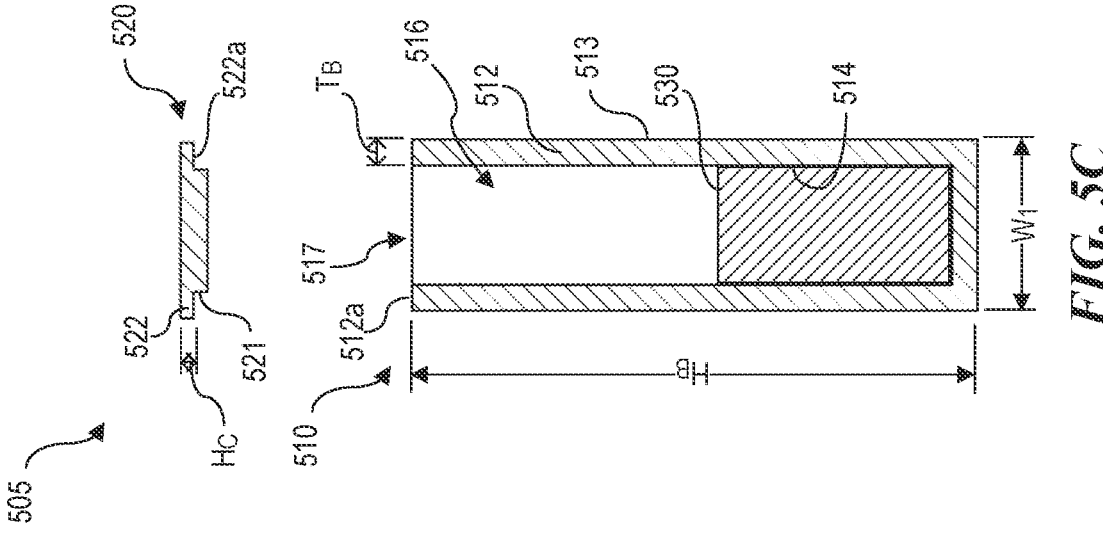
FIG. 5C is a cross-sectional side view of a container configured to hold the Ba-133 source matrix within the syringe of FIGS. 5A and 5B in accordance with embodiments of the present technology.
Figure 5B:
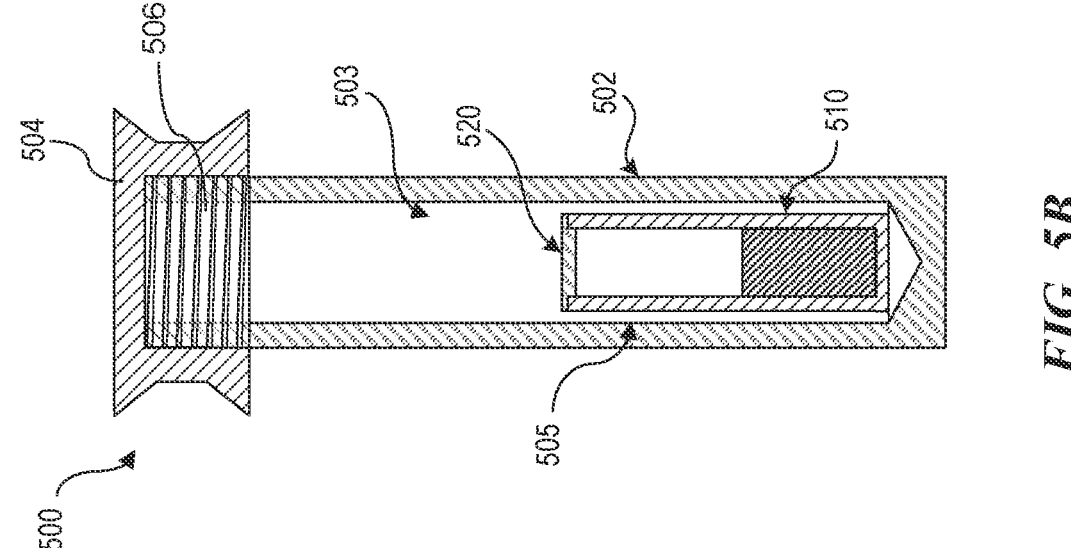
FIG. 5B is a cross-sectional side view of the syringe shown in FIG. 5A.
Figure 5A:
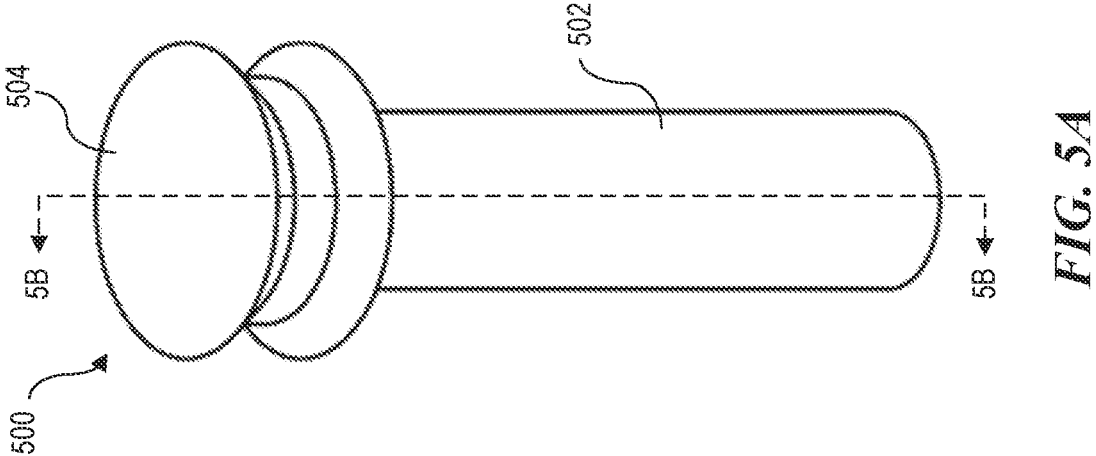
FIG. 5A is an isometric view of a syringe configured for use as a Ba-133-based standard in accordance with embodiments of the present technology.

Although the Ba-133-based standard described in FIGS. 4A and 4B is in the form of a capsule, the present technology further includes Ba-133-based standards in additional configurations that are used to administer I-131 drug products. FIGS. 5A-5C, for example, illustrate a syringe 500 configured for use as a Ba-133-based standard in accordance with embodiments of the present technology. In particular, FIG. 5A is a perspective view of the syringe 500, FIG. 5B is a cross-sectional side view of the syringe 500 taken along line 5B-5B in FIG. 5A, and FIG. 5C is an exploded side cross-sectional view of a container 505 positionable within the syringe as shown in FIG. 5B. As one skilled in the art will appreciate, the use of the term "syringe" in the context of a Ba-133-based standard is used to signify that the syringe 500 has a general shape of a conventional syringe for administering therapeutic fluids, but does not require that the device function as a conventional syringe (i.e., able to administer a liquid solution via, e.g., a needle). As with the container 400, the syringe 500 is designed to be used as a source standard for calibrating radioactivity measuring instruments, and is not intended to deliver a dosage to a patient.

As described in detail below, the container 505 can hold a Ba-133 source matrix 530 and is designed to attenuate certain energy emissions from the Ba-133 source matrix 530 such that the detectable energy emissions from the syringe 500 are at least similar to standard energy emissions of I-131. As a result, the syringe 500 enables Ba-133 to be used as a source-standard for calibrating I-131 radioactivity measuring instruments. The calibrated I-131 radioactivity measuring instruments can then be used to measure and confirm the radioactivity of I-131 containing syringes that will be used for therapeutic purposes.

Referring to FIG. 5A, the syringe 500 includes a barrel 502 and a top 504. The syringe 500 can be composed of acrylic or other plastic material. As shown in FIG. 5B, the top 504 is configured to be releasably secured to the barrel 502, e.g., via a series of threaded engagement features 506 or other retention mechanisms. The barrel 502 and top 504 can together define an interior cavity 503. The syringe 500 further includes a container 505 sized and shaped to fit within the interior cavity 503. In some embodiments, the container 505 can be at least generally similar in structure and function to the container 400 shown in FIGS. 4A and 4B. For example, the container 505 can include a body 510 and a cap 520 and can be configured to contain the Ba-133 source matrix 530. As described in detail below, the container 505 can be designed to attenuate X ray emissions from the Ba-133 source matrix 530, similar to the container 400 described with reference to FIGS. 4A and 4B. In some embodiments, the syringe 500 can further include an element 506.

FIG. 5C further illustrates the container 505 and shows the cap 520 removably detached from the body 510. The body 510 is defined by a body wall 512 (e.g., side wall, barrier, etc.). The body wall 512 can be generally similar to the body wall 412 of the container 400 (FIG. 4B). For example, the body wall 512 can be composed of stainless steel or other materials that provide suitable radioactivity attenuation characteristics, and can have a thickness $T_B$ of between about 0.025 inch and about 0.070 inch, such as between about 0.035 inch and about 0.060 inch, although other values outside the foregoing dimensions are possible and are within the scope of the present technology. In some embodiments, the thickness $T_B$ is substantially uniform throughout the entirety of the body wall 512. The body 510 further includes an interior chamber 516 (e.g., void space) defined by the body wall 512. The interior chamber 516 is configured to receive and house the Ba-133 source matrix.

The cap 520 includes a cylindrical inner surface 521 configured to frictionally fit within an opening 517 in the body 510. The cap 520 can further include an outer flange 522 with a lower surface 522a configured to contact an upper surface 512a of the body wall 512. When the cap 520 is positioned over the opening 517, the cap 520 fully encloses the interior chamber 516 defined by the body 510 to retain the Ba-133 source matrix 530 therein.

In some embodiments, the body 510 can have a height $H_B$ between about 0.5 inch and about 2.5 inches (e.g., about 1.2 inches), and a Width $W_1$ between about 0.125 inch and about 1 inch (e.g., about 0.35 inch). The outer flange 522 of the cap 520 can have a height $H_2$ between about 0.0125 inch and about 0.1 inch (e.g., about 0.25 inch). Accordingly, the total height of the container 505 can be between about 0.5 inch and about 3 inches. One skilled in the art will recognize that the present disclosure encompasses containers having dimensions outside the foregoing ranges. Accordingly, the present technology is not limited to the foregoing dimensions, sizes, configurations, spacings, etc., and other embodiments may have other dimensions, sizes, configurations, and spacings without departing from the present disclosure.

Similar to the container 400 (FIGS. 4A and 4B), the container 505 is also configured to selectively attenuate X ray emissions from radioactive material contained within the chamber 516. For example, the body wall 512 can have properties that attenuate X ray emissions from the Ba-133 source matrix, such as those in the energy range of between about 30 keV and 60 keV. For example, the body wall 512 can be configured to attenuate X ray emissions by at least 50%, at least 75%, at least 80%, at least 85%, at least 90%, or at least 95%. In some embodiments, this attenuation is accomplished by selection of the thickness $T_B$ of the body wall 512, the material composition of the body wall 512, and/or a combination of the thickness $T_B$ and the material composition. For example, in embodiments in which the container 505 is composed of stainless steel, the body wall 512 can have a thickness $T_B$ between about 0.04 inch and about 0.07 inch, or between about 0.05 inch and 0.06 inch, or about 0.055 inch. For other materials (e.g., aluminum, tungsten, titanium, etc., and alloys thereof), the wall thickness can be determined based on the respective photon mass attenuation coefficients for the other materials, as described in Section C below.

In some embodiments, the container 505 does not (or at least does not substantially) attenuate energy emissions in other spectrums (e.g., gamma emissions). The container 505 therefore causes the energy emissions of the Ba-133 source matrix contained within the container 505, when measured externally to the syringe 500, to be similar to expected energy emissions of I-131. The syringe 500 is therefore expected to alleviate or at least reduce the conventional shortcomings of using Ba-133 as a source standard for calibrating I-131 radioactivity measuring instruments.

Figure 6B:
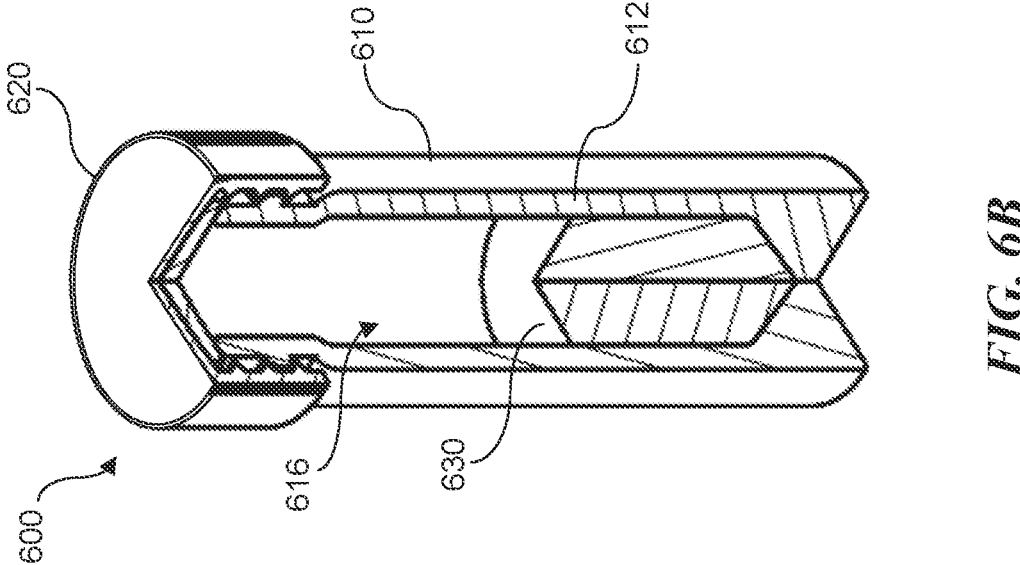
FIG. 6B is a partially cut-away isometric view of the container shown in FIG. 6A.
Figure 6A:
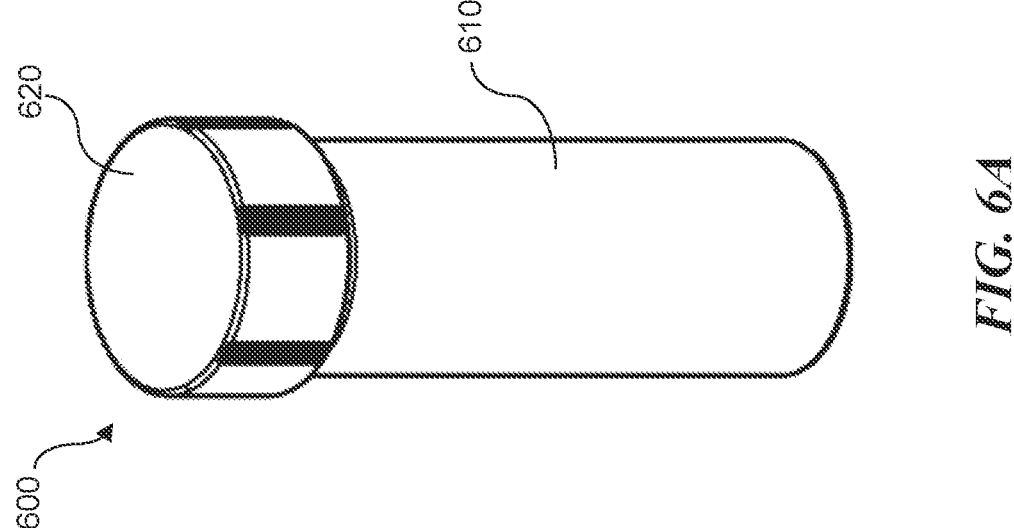
FIG. 6A is an isometric view of another container for holding Ba-133 source matrix and configured for use as a Ba-133-based standard in accordance with embodiments of the present technology.

FIGS. 6A and 6B illustrate yet another container 600 configured for use as a Ba-133-based standard in accordance with embodiments of the present technology. In particular, FIG. 6A is an isometric view of the container 600 and FIG. 6B is a partially cut-away isometric view of the container 600. As shown in FIGS. 6A and 6B, the container is in the form of a vial and includes a cylindrical body 610 and a cap 620. The cap 620 is configured to be releasably secured to the body 610, e.g., via a series of threaded engagement features or other retention mechanisms.

Referring to FIG. 6B, the body is defined by a body wall 612 (e.g., side wall, a partition, barrier, etc.) that can be generally similar to the body wall 412 of the container 400 (FIG. 4B) and/or the body wall 512 of the container 505 (FIGS. 5B and 5C). The body 610 further includes an interior chamber 616 (e.g., void space) defined by the body wall 612. As shown in FIG. 6B, a Ba-133 source matrix 630 can be contained within the interior chamber 616. The Ba-133 source matrix 630 can be any source matrix described herein, such as an epoxy resin, resin bead, ceramic, electroplated metallic surface or other suitable structure or solution that contains Ba-133.

Similar to the container 400 (FIGS. 4A and 4B) and the container 505 (FIGS. 5A-5C), the container 600 is also configured to selectively attenuate X ray emissions from the Ba-133 source matrix 630 contained within the interior chamber 616. For example, the body wall 612 can have properties that attenuate X ray emissions from the Ba-133 source matrix 630, such as those in the energy range of between about 30 keV and 60 keV. For example, the body wall 612 can be configured to attenuate X ray emissions by at least 50%, at least 75%, at least 80%, at least 85%, at least 90%, or at least 95%. In some embodiments, this attenuation is accomplished by selection of the thickness of the body wall 612, the material composition of the body wall 612, and/or a combination of the thickness and the material composition. In some embodiments, the container 600 does not (or at least does not substantially) attenuate energy emissions in other spectrums (e.g., gamma emissions). The container 600 therefore causes the externally detectable energy emissions of the Ba-133 source matrix 630 contained within the container 600 to be similar to expected energy emissions of I-131. The container 600 is therefore expected to alleviate or at least reduce the conventional shortcomings of using Ba-133 as a source standard for calibrating I-131 radioactivity measuring instruments.

As set forth above, embodiments of each of the containers 400, 505, and 600 described with reference to FIGS. 4A-6B are configured to (1) contain Ba-133 source matrix, and (2) selectively attenuate X ray energy emissions. Accordingly, each of the containers 400, 505, and 600 can be configured for use as a Ba-133-based standard. Without being bound by theory, the Ba-133 based standards of the present technology are expected to have a measurable radioactivity on an I-131 dial setting of a dose calibrator that is within ±10%, ±5%, ±4%, ±3%, ≅2%, and/or ±1% of the measured Ba-133 activity of the Ba-133 source matrix when tested on the Ba-133 dial setting of the same dose calibrator. Moreover, the Ba-133-based standards of the present technology are expected to have a useful life (e.g., a time period in which decay does not substantially affect the radioactivity of the standard) that far exceeds the useful life of an I-131-based standard. For example, the Ba-133-based standards of the present technology can have a useful life of between about 1 year and about 12 years, such as at least 1 year, at least 2 years, at least 3 years, at least 4 years, etc.

C. Calculating Wall Thicknesses Using Mass Attenuation Coefficients

As set forth above, the various containers 400, 505, and 600 described herein can have a thickness and material composition that selectively attenuates certain energy emissions from a source matrix contained therein. In some embodiments, the wall thickness can be determined based at least in part on the photon mass attenuation coefficient (p/p) of the material forming the container for the photon energies of interest (e.g., X ray emissions for Ba-133 based standards that mimic I-131).

The mass attenuation coefficient is a constant describing the fraction of photons removed from a monochromatic x-ray beam by a homogeneous absorber per unit mass. It is equivalent to the linear attenuation coefficient divided by the density of the absorber, and is expressed in $cm^2/g$. For alloys, the mass attenuation coefficient can be determined using an additivity function expressed by the following equation:

$$\mu/\rho(\text{alloy}) = \sum_i = w_i\left(\frac{\mu}{p}\right)i$$

in which $w_i$ is the fraction by weight of the ith atomic element and $\mu/\rho_{(i)}$ is the mass attenuation coefficient of the ith atomic element in $cm^2/g$.

Figure 7A:
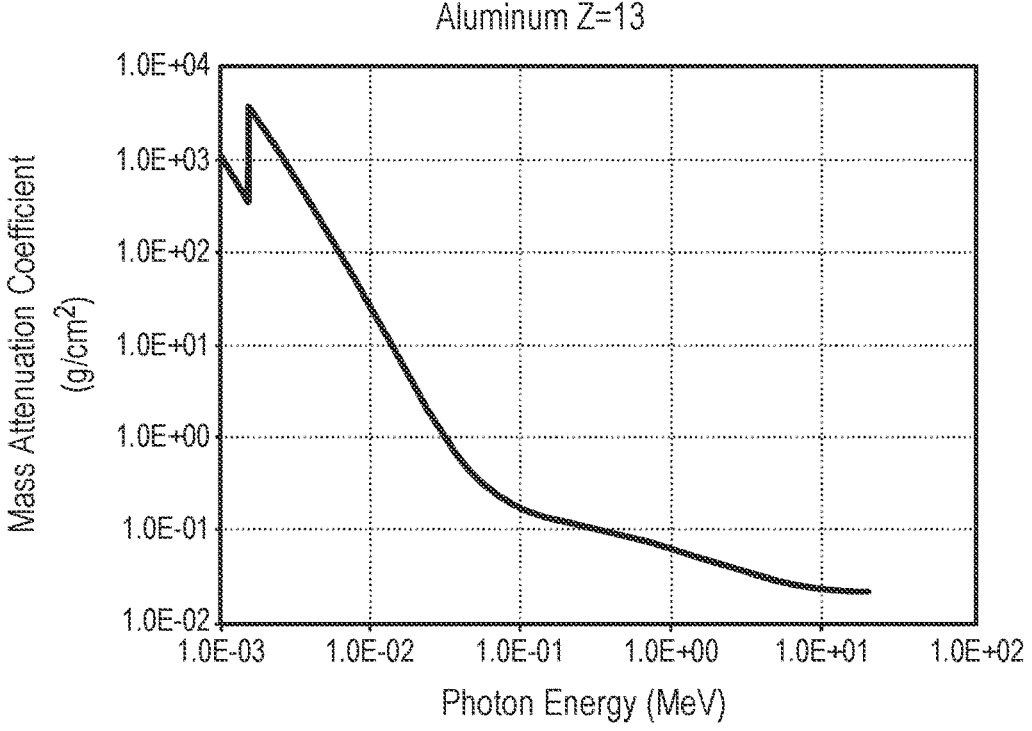
FIGS. 7A-7D are line graphs illustrating the mass attenuation coefficients for certain materials.
Figure 7B:
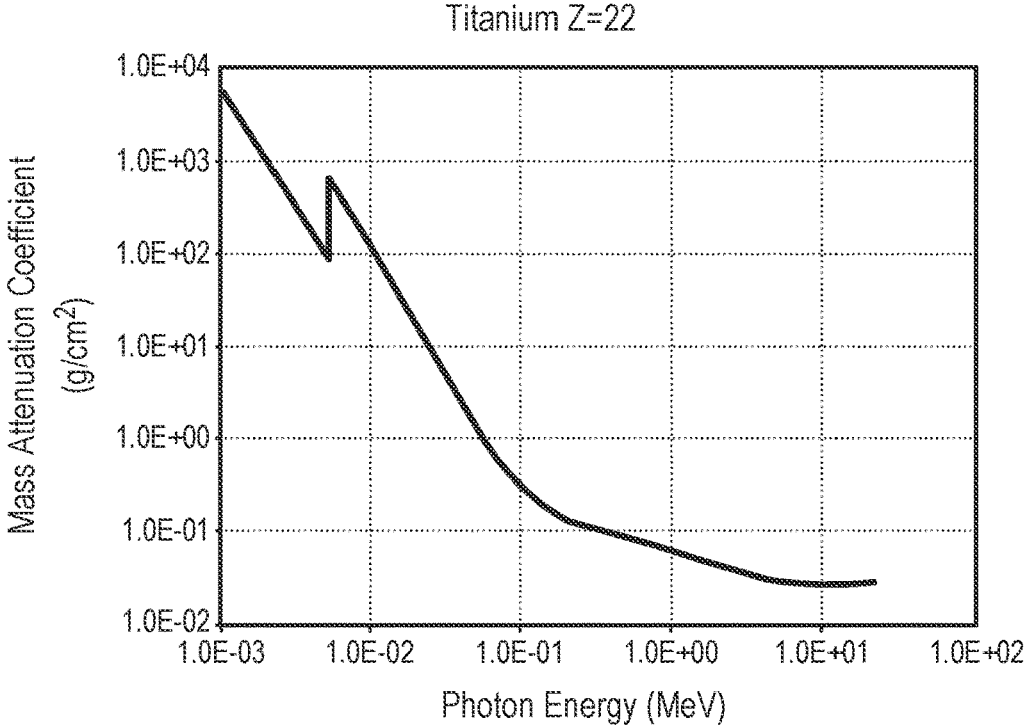
Figure 7C:
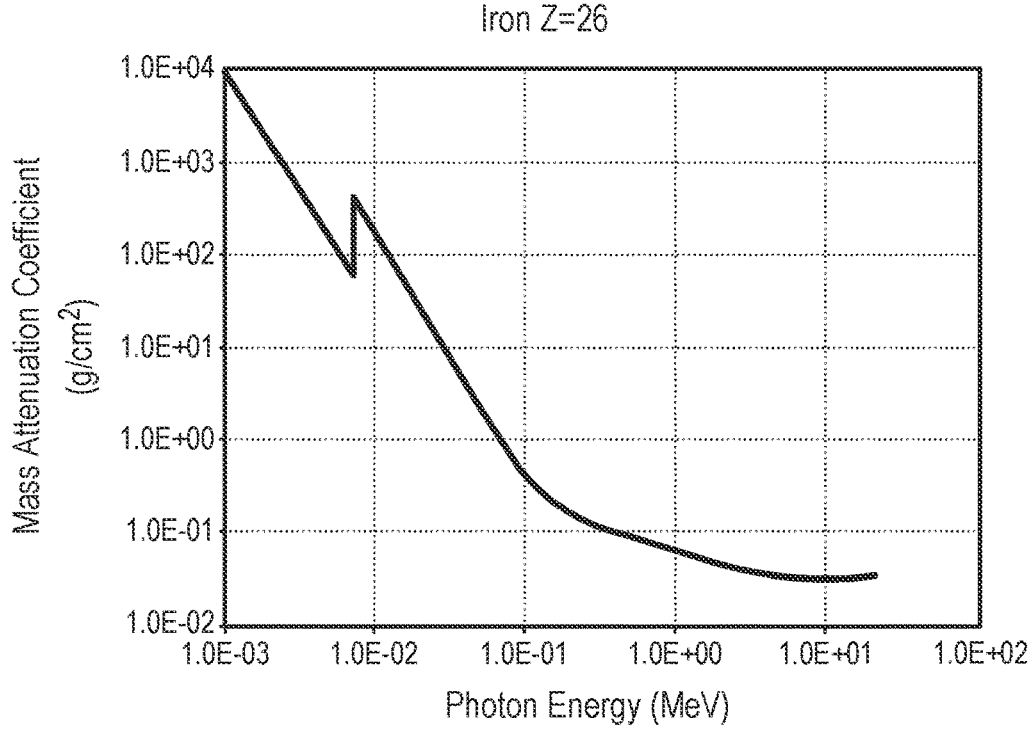
Figure 7D:
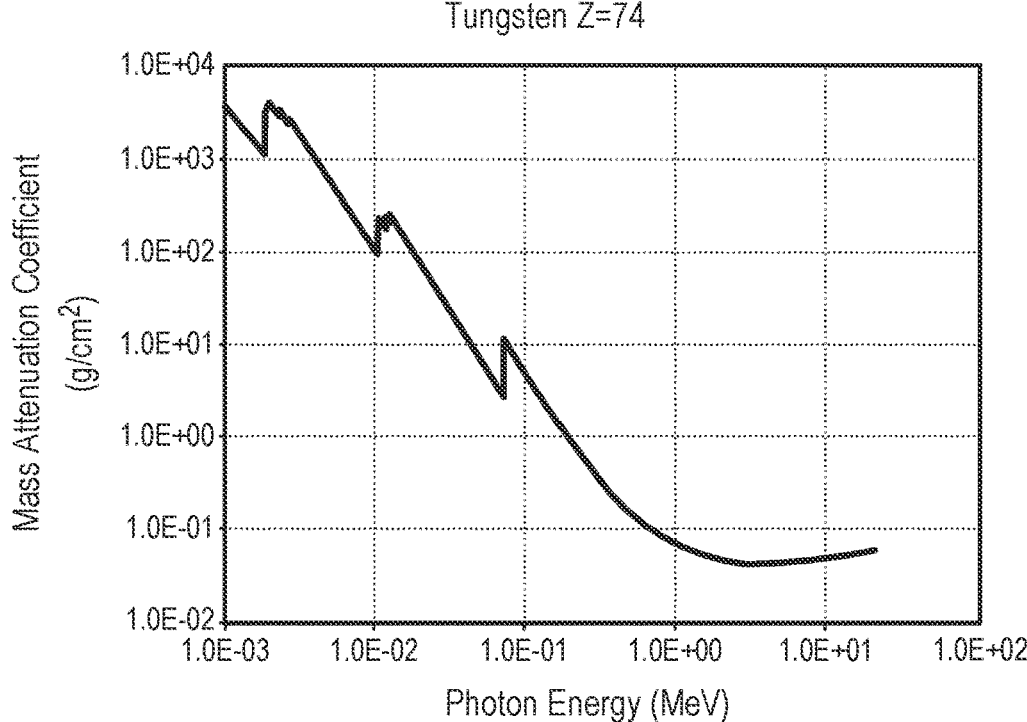

The mass attenuation coefficients of four representative materials are shown in FIGS. 7A-7D. In particular, FIG. 7A is a line graph illustrating mass attenuation coefficients for aluminum (Al) at various photon energies, FIG. 7B is a line graph illustrating mass attenuation coefficients for titanium (Ti) at various photon energies, FIG. 7C is a line graph illustrating mass attenuation coefficients for iron (Fe) at various photon energies, and FIG. 7D is a line graph illustrating mass attenuation coefficients for Tungsten (W) at various photon energies. The mass attenuation coefficients for various other elements and materials can be found, e.g., at the National Institute of Standards Technology (NIST) in the Standard Reference Database 126, which is incorporated by reference herein in its entirety.

Using the mass attenuation coefficient for a given material at a specific photon energy of interest, the transmitted photon intensity through a given material having a specific wall thickness can be determined using a modified version of Beer's Law, which describes the absorption of radiant energy through a medium:

$$I = I_0 e^{-\left(\frac{\mu}{\rho}\right)\rho x}$$

in which I is the transmitted photon intensity, $I_0$ is the incident photon intensity, $\mu/\rho$ is the mass attenuation coefficient in $cm^2/g$, $\mu$ is the linear attenuation coefficient in $cm^{-1}$, $\rho$ is the density of the material in $g/cm^3$, $\rho x$ is the mass thickness of the material in $g/cm^3$, and x is the path length in cm. Based on the material selected, the foregoing equation can therefore be used to calculate an estimated thickness necessary to achieve a desired attenuation of a specific photon energy of interest.

For example, Table 1 below lists the thickness necessary to reduce the intensity of 30 keV photon fluence by a factor of 100 ($I/I_0$=0.01) for four materials (Al, Ti, Fe, and W), as calculated using their mass attenuation coefficients for 30 keV photons and applying the modified Beer's Law equation specified above.

TABLE 1

| Calculated Wall Thickness for Select Materials | | | | |
| --- | --- | --- | --- | --- |
| Element | Aluminum | Titanium | Iron | Tungsten |
| Density (g/cm³) | 2.7 | 4.5 | 7.874 | 19.3 |
| μ/ρ at 30 keV(cm²/g) | 788.0 | 332.3 | 557.6 | 1902.0 |
| Thickness (cm) | 2.16E–03 | 3.08E–03 | 1.05E–03 | 1.25E–04 |

D. Embodiments of Methods and Systems for Using Barium-133-Based Standards to Calibrate Radioactivity Measuring Instruments FIG. 8 is a schematic illustration demonstrating a workflow 800 for using the Ba-133 standards described herein to calibrate an I-131 radioactivity measuring instrument in accordance with embodiments of the present technology.

Figure 8:
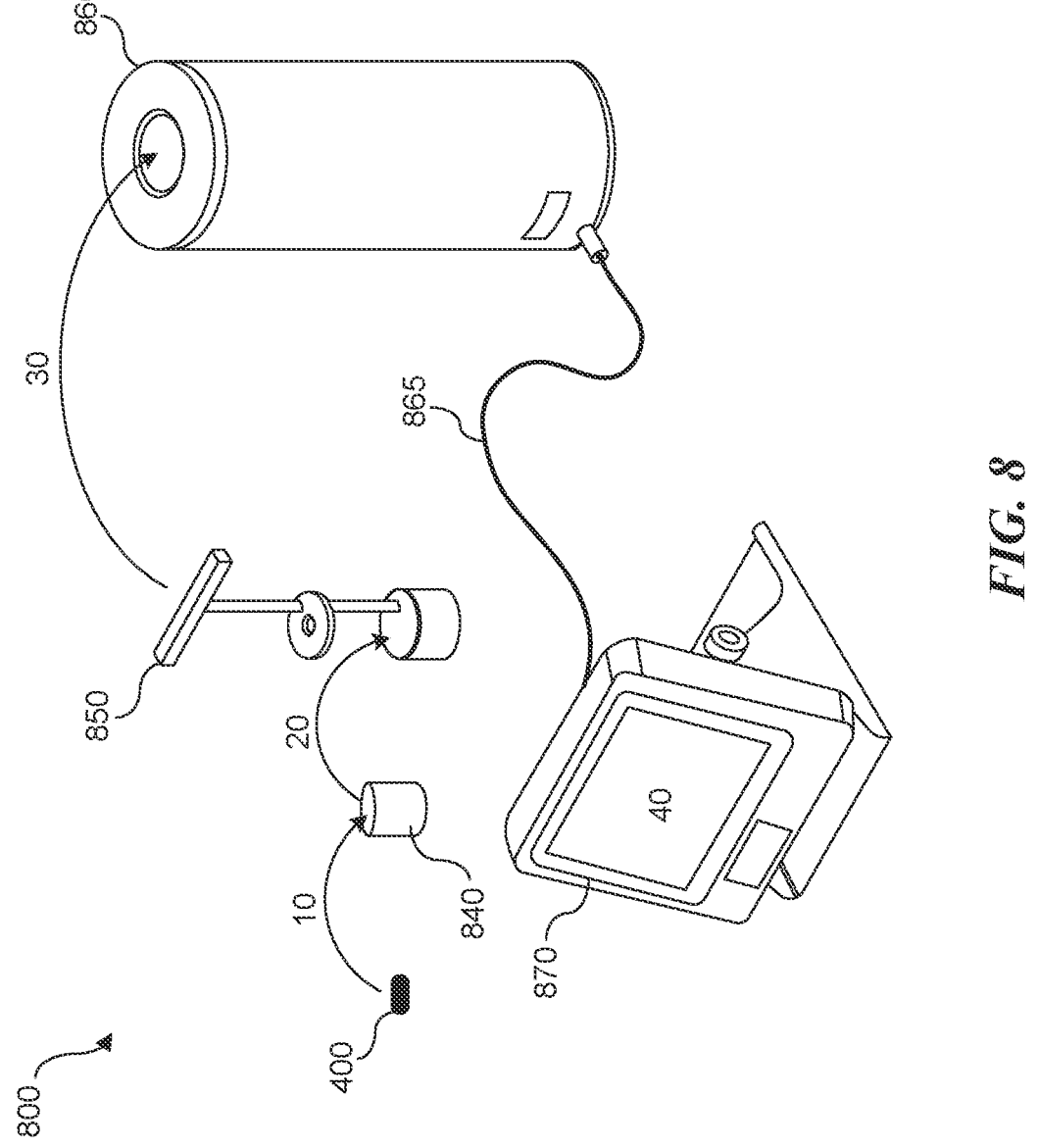
FIG. 8 is a partially schematic illustration of a workflow for use of a Ba-133-based standard to calibrate an I-131 radioactivity measuring instrument in accordance with embodiments of the present technology.

The workflow begins in step 10 by placing the Ba-133 standard, illustrated in FIG. 8 as the capsule 400 described above with references to FIGS. 4A and 4B, within a cup or vial 840. Although the Ba-133 standard is depicted as the capsule 400, the same or similar operation described herein for calibrating a radioactivity measuring instrument can be performed using other embodiments of the Ba-133 containing standards described herein, such as the syringe 500 (FIGS. 5A-5C) or the container 600 (FIGS. 6A and 6B).

The workflow 800 continues in step 20 by placing the vial 740 holding the Ba-133 standard 400 into a dose calibrator dipper 850, and in step 30 by placing the dose calibrator dipper 850 into a radioactivity measuring instrument 860 (e.g., a dose calibrator). The dipper 850 holds the vial 840 and enables a user to easily and correctly position the standard 400 into the radioactivity measuring instrument 860.

The workflow continues in step 40 by measuring the radioactivity of the capsule 400 using, e.g., a I-131 dial setting on a control module 870 of the radioactivity measuring instrument 860. For example, a user can simply select the I-131 dial and initiate measurement via a user interface of the control module 870. The control module 870 will direct the radioactivity measuring instrument 860 to detect and measure the radioactivity of the capsule 400, and will display the measured radioactivity via a user display. The control module 870 can be connected to the radioactivity measuring instrument 860 by way of a wired connection 865, although in other embodiments the control module 870 can be coupled via a wireless connection.

To calibrate the radioactivity measuring instrument 860, the user adjusts the I-131 dial setting while viewing the radioactivity measuring instrument 860 until the measured response is within at least ±5% (e.g., within ±1%) of the known decay corrected Ba-133 activity contained within the capsule 400.

E. Surrogate Source Standards for Short-Lived Radioisotopes

Although the foregoing disclosure describes using a Ba-133 based source standard that mimics or at least approximates the energy emission profiles of I-131, the present technology is not limited to such embodiments. For example, the methodologies of the present technology can also be used to develop surrogate calibration standards for other short-lived radioisotopes (e.g., radioisotopes having a half-life that renders them impractical or otherwise undesirable to be used as a standard). In particular, the surrogate calibration standards can include longer-lived radioisotopes that have at least generally similar energy emissions to the short-lived radioisotopes they are used to mimic and/or approximate. Examples of such longer-lived radioisotopes can include, but are not limited to, cobalt-57 ("Co-57"), germanium-68/gallium-68 ("Ge/Ga-68"), sodium-22 ("Na-22"), and gadolinium-153 ("Gd-153"); and examples of such short-lived radioisotopes can include, but are not limited to, thallium-201 ("Tl-201"), indium-111 ("In-111"), iodine-123 ("1-123"), lutetium-177 ("Lu-177"), copper-64 ("Cu-64"), and technetium-99m ("Tc99m"). As specific examples, in some embodiments Co-57 can be used as a surrogate for Lu-177, and Ge/Ga-68 can be used as a surrogate for Cu-64. The containers for such standards can be generally similar to the containers 400, 505, and 600 described herein, except that the material and wall thickness can be modified to selectively attenuate certain energy emissions of the longer-lived radioisotope such that it behaves more similarly to the short-lived radioisotope it is selected to mimic or at least approximate. The material and thickness can be selected based, for example, on the mass attenuation coefficient for the material at the photon energy that needs to be attenuated, as described in Section C herein. Accordingly, without being bound by theory, the methodologies of the present technology are expected to be useful in identifying and developing surrogate source standards for nuclear medicine or other radioactive applications that rely on short-lived radioisotopes, and for which an appropriate calibration standard is not available, difficult to maintain, or expensive. Accordingly, the present technology is not limited to the express embodiments herein.

F. Nonlimiting Examples

The applicant of the present application has tested various different container configurations for use as a Ba-133-containing source standard for calibrating I-131 radioactivity measuring instruments. Tests were conducted using a Ba-133 source matrix with a nominal activity of 100 microcurie ("uCi"). An initial test measured the radioactivity of the Ba-133 source matrix using both the Ba-133 dial setting and the I-131 dial setting on a previously calibrated AtomLab 500 radioactivity measuring instrument. To determine the container wall thickness necessary to achieve the desired attenuation, the Ba-133 source matrix was also placed in grade 304 stainless-steel tubes with varying wall thickness and assayed using the Ba-133 dial setting and the I-131 dial setting of the AtomLab 500 radioactivity measuring instrument. Example results of the assays are shown in Table 2, below.

TABLE 2

Measured Energy Emissions of Ba-133 in Various Containers

| Approximate Wall Thickness | Ba-133 Dial response (uCi) | I-131 Dial Response (uCi) | Percent Error (%) |
|---|---|---|---|
| No container (control) | 111.9 | 346.3 | 209.6 |
| ≈0.01 inch | 53.3 | 165.8 | 48.2 |
| ≈0.016 inch | 44.4 | 137.8 | 23.2 |
| ≈0.02 inch | 40.5 | 125.2 | 11.9 |

As reflected in Table 2, the activity detected by the instrument on both the I-131 dial and the Ba-133 dial decreased as the thickness of the wall increased. Accordingly, percent error of the I-131 dial reading relative to the control (i.e., the activity measured using the Ba-133 dial with no container) decreased as the tube wall thickness increased. This demonstrates that the thickness of the wall is an effective variable for attenuating energy emissions.

Figure 9:
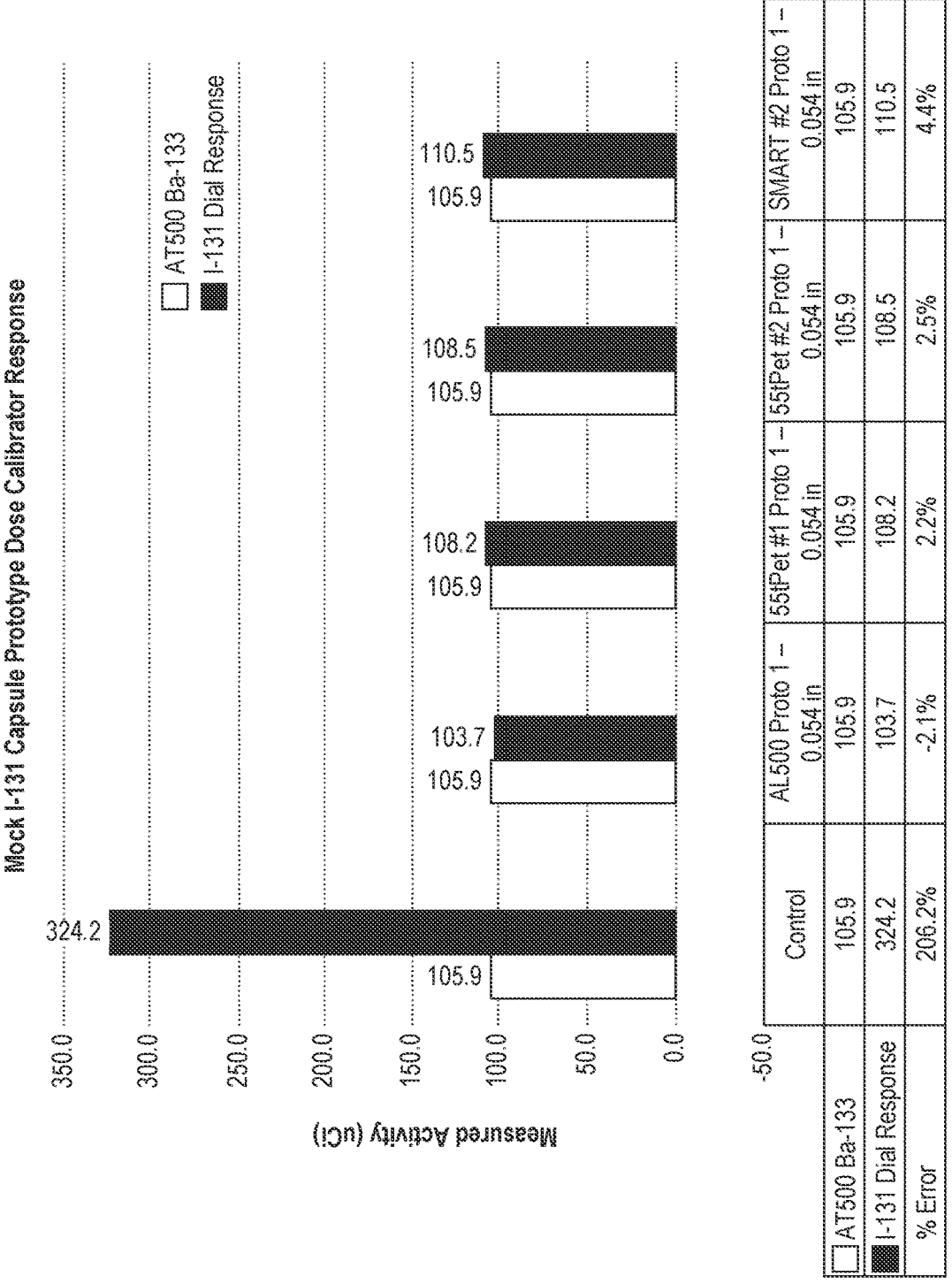
FIG. 9 is a bar graph depicting the radioactivity of a Ba-133-based standard as measured by various radioactivity measuring instruments in accordance with embodiments of the present technology.

Based on the initial data, additional testing was performed using a test capsule similar to the test capsule 400 described with reference to FIGS. 4A-4C having a wall thickness of 0.054 inch and containing Ba-133 source matrix. The test capsule was tested on four different radioactivity measurement instruments: the AtomLab 500, two CAP INTEC Model 55tPet dose calibrators, and a CAPINTEC SMART dose calibrator. The test capsule was tested on the I-131 dial setting for each of the respective measurement instruments. FIG. 9 is a bar graph illustrating the results of the testing. As shown, the percent error between the capsule and the control varied between −2.1% and 4.4% based on the instrument used. Thus, it was determined that a test capsule having a wall thickness of 0.054 inch was a suitable source standard that could be used with a variety of different radioactivity measuring instruments having a relatively low deviations of less than 5%. Without being bound by theory, it is expected to be beneficial to have a single standard that can be used across different radioactivity measuring instruments for simplicity and consistency.

The foregoing examples and associated discussion are provided by way of illustration only and the present technology disclosed herein is therefore not limited to the materials, dimensions, or the like described above. Rather, the present technology encompasses other materials and dimensions having suitable radioactivity attenuating characteristics and that can be configured as a Ba-133 based source standard.

CONCLUSION

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

The above Detailed Description of examples and embodiments of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. The teachings of the present technology provided herein can be applied to other systems, not necessarily the system described above. The elements and acts of the various examples described above can be combined to provide further implementations of the present technology. Further, any specific numbers noted herein are only examples: alternative implementations may employ differing values or ranges.

While the above description describes various embodiments of the present technology and the best mode contemplated, regardless how detailed the above text, the present technology can be practiced in many ways. Details of the system may vary considerably in its specific implementation, while still being encompassed by the present disclosure. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing the present technology under the claims.

From the foregoing, it will be appreciated that specific embodiments of the present technology have been described herein for purposes of illustration, but that various modifications may be made without deviating from the spirit and scope of the various embodiments of the invention. Further, while various advantages associated with certain embodiments of the present technology have been described above in the context of those embodiments, other embodiments may also exhibit such advantages, and not all embodiments need necessarily exhibit such advantages to fall within the scope of the present disclosure. Accordingly, the present technology is not limited, except as by the appended claims.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

We claim:

1. A barium-133 (Ba-133) based standard for calibrating an iodine-131 (I-131) radioactivity measuring instrument, the Ba-133 based standard comprising:
   a container having one or more walls forming an enclosed chamber; and
   a source matrix including Ba-133 positioned within the enclosed chamber, wherein Ba-133 is the sole radionuclide in the source matrix,
   wherein the container attenuates X ray emissions from the source matrix.

2. The Ba-133 based standard of claim 1 wherein the container selectively attenuates X ray emissions in an energy range of between about 30 keV and about 60 keV.

3. The Ba-133 based standard of claim 1 wherein the container attenuates X ray emissions from the source matrix by at least 50%.

4. The Ba-133 based standard of claim 1 wherein the container attenuates X ray emissions from the source matrix by at least 80%.

5. The Ba-133 based standard of claim 1 wherein the container selectively attenuates X ray emissions without substantially attenuating energy emissions in other spectrums.

6. The Ba-133 based standard of claim 1 wherein the one or more walls have a thickness and a material composition, and wherein at least one of the thickness or the material composition selectively attenuates X ray emissions.

7. The Ba-133 based standard of claim 1 wherein the container selectively attenuates X ray emissions such that detectable energy emissions of the source matrix external to the container approximate an expected energy emission of I-131 radioactive material.

8. The Ba-133 based standard of claim 1 wherein the Ba-133 based standard has a measurable radioactivity on an I-131 setting of a dose calibrator that is within ±10% of a measurable Ba-133 activity of the source matrix when tested on the Ba-133 setting of the dose calibrator.

9. The Ba-133 based standard of claim 8 wherein the measurable radioactivity is within ±3%.

10. The Ba-133 based standard of claim 1 wherein the Ba-133 based standard has a useful life of between 1 year and 12 years.

11. The Ba-133 based standard of claim 1 wherein the one or more walls are composed at least partially of stainless steel, aluminum, titanium, or alloys thereof.

12. The Ba-133 based standard of claim 1 wherein the container is a capsule, a vial, or configured for placement within a syringe.

13. The Ba-133 based standard of claim 1 wherein the container is composed of stainless steel, and wherein at least one of the one or more walls have a thickness in a range of from about 0.04 inch to about 0.07 inch.

14. The Ba-133 based standard of claim 13 wherein the thickness is in a range of from about 0.05 inch to about 0.06 inch.

15. The Ba-133 based standard of claim 1 wherein the container is composed of tungsten.

* * * * *